US010795536B2

(12) United States Patent
Martin et al.

(10) Patent No.: US 10,795,536 B2
(45) Date of Patent: Oct. 6, 2020

(54) INTERACTIVE PRESENTATION CONTROLS

(71) Applicant: Pearson Education, Inc., New York, NY (US)

(72) Inventors: Jacqueline Martin, St. Albans (GB); Yvette Roberts, Harlow (GB); Joanne Hunter, Harlow (GB); Nathan Harris, London (GB)

(73) Assignee: PEARSON EDUCATION, INC., New York, NY (US)

( * ) Notice: Subject to any disclaimer, the term of this patent is extended or adjusted under 35 U.S.C. 154(b) by 251 days.

(21) Appl. No.: 15/387,284

(22) Filed: Dec. 21, 2016

(65) Prior Publication Data

US 2017/0205987 A1      Jul. 20, 2017

Related U.S. Application Data

(60) Provisional application No. 62/279,452, filed on Jan. 15, 2016.

(51) Int. Cl.
*G06F 3/0481* (2013.01)
*G06F 3/0488* (2013.01)
(Continued)

(52) U.S. Cl.
CPC ........ *G06F 3/04817* (2013.01); *G06F 3/0482* (2013.01); *G06F 3/0483* (2013.01);
(Continued)

(58) Field of Classification Search
CPC .......... G06F 3/00; G06F 3/048–04897; G06Q 10/109; G06Q 10/101; G06Q 10/10;
(Continued)

(56) References Cited

U.S. PATENT DOCUMENTS 5,250,929 A * 10/1993 Hoffman ............... G06F 3/0488
178/18.03
7,043,529 B1 * 5/2006 Simonoff ............... H04L 67/02
709/204
(Continued)

FOREIGN PATENT DOCUMENTS

EP        1124176      8/2001
GB     2477456 A      8/2011
(Continued)

OTHER PUBLICATIONS

PCT International Search Report and Written Opinion dated Mar. 29, 2017 for related international application PCT/US16/68043, 10 pages.

*Primary Examiner* — Kieu D Vu
*Assistant Examiner* — Alvaro R Calderon, IV
(74) *Attorney, Agent, or Firm* — Quarles and Brady LLP

(57) ABSTRACT

The present disclosure provides systems, device configurations, and processes for displaying presentation control interfaces as overlays of content being displayed by an interactive whiteboard computing system in an interactive presentation environment, including one or more panels displaying selectable icons for performing various control tasks, including: viewing a present position and changing position within a sequence for the presentation; inputting, finding, and loading data to be stored for the presentation; interacting with the computing system or connected devices; and the like. Additional configurations include automatically showing, hiding, and/or repositioning control interface panels so that they are accessible by the presenter without substantially interfering with the presentation.

16 Claims, 12 Drawing Sheets

(51) Int. Cl.
*G06F 3/0482* (2013.01)
*G06F 3/0483* (2013.01)
*G06F 3/0489* (2013.01)

(52) U.S. Cl.
CPC ........ *G06F 3/0488* (2013.01); *G06F 3/04883* (2013.01); *G06F 3/04886* (2013.01); *G06F 3/04897* (2013.01); *G06F 2203/04803* (2013.01)

(58) Field of Classification Search
CPC .............. H04L 12/18; H04L 29/06401; H04L 65/4015; H04L 12/813; H04L 29/06421; H04L 29/08684; H04L 12/5815; G03B 21/00; G03B 21/10; G03B 21/54; G03B 27/30; B43L 1/00; A47B 97/00; G09B 11/00; H04N 7/16; H04N 7/157; H04N 1/00437; H04M 3/567
See application file for complete search history.

(56) References Cited

U.S. PATENT DOCUMENTS

| | | | | |
|---|---|---|---|---|
| 8,402,391 | B1* | 3/2013 | Doray | G06F 3/0482 715/834 |
| 8,806,354 | B1* | 8/2014 | Hyndman | G06F 3/04883 709/204 |
| 8,887,046 | B2 | 11/2014 | Shmuylovich et al. | |
| 10,146,423 | B1* | 12/2018 | Reed | G06F 3/0418 |
| 2002/0085029 | A1* | 7/2002 | Ghani | G06Q 10/10 715/751 |
| 2002/0085030 | A1* | 7/2002 | Ghani | G06Q 10/10 715/751 |
| 2002/0087592 | A1* | 7/2002 | Ghani | G06Q 10/10 715/239 |
| 2003/0124502 | A1* | 7/2003 | Chou | G09B 5/00 434/350 |
| 2004/0030781 | A1* | 2/2004 | Etesse | G06Q 30/06 709/225 |
| 2004/0153509 | A1* | 8/2004 | Alcorn | G06Q 30/06 709/205 |
| 2004/0263636 | A1* | 12/2004 | Cutler | H04N 7/15 348/211.12 |
| 2006/0036568 | A1 | 2/2006 | Moore et al. | |
| 2011/0169736 | A1* | 7/2011 | Bolt | G06F 1/1639 345/158 |
| 2011/0225494 | A1* | 9/2011 | Shmuylovich | G06F 3/04883 715/705 |
| 2011/0225631 | A1* | 9/2011 | Pearson | G06F 21/6218 726/4 |
| 2011/0227827 | A1* | 9/2011 | Solomon | G06F 3/0321 345/158 |
| 2011/0234746 | A1* | 9/2011 | Saleh | G06F 3/041 348/14.03 |
| 2011/0298722 | A1* | 12/2011 | Tse | G06F 3/017 345/173 |
| 2012/0011465 | A1* | 1/2012 | Rezende | G06F 3/0488 715/786 |
| 2012/0046961 | A1* | 2/2012 | Pearson | G06Q 10/06 705/1.1 |
| 2012/0179994 | A1* | 7/2012 | Knowlton | G06F 3/0488 715/779 |
| 2012/0231441 | A1* | 9/2012 | Parthasarathy | G09B 7/02 434/362 |
| 2012/0260195 | A1* | 10/2012 | Hon | G06F 16/954 715/753 |
| 2013/0047093 | A1* | 2/2013 | Reuschel | G06F 3/04883 715/753 |
| 2013/0227433 | A1* | 8/2013 | Doray | G06F 3/0482 715/753 |
| 2013/0339880 | A1* | 12/2013 | Hutchinson | G09B 5/067 715/753 |
| 2013/0346878 | A1* | 12/2013 | Mason | G06F 3/01 715/753 |
| 2013/0346910 | A1* | 12/2013 | Mason | G06F 3/04883 715/781 |
| 2014/0055400 | A1* | 2/2014 | Reuschel | G06F 9/452 345/173 |
| 2014/0164984 | A1* | 6/2014 | Farouki | G06F 3/0481 715/784 |
| 2014/0201682 | A1* | 7/2014 | Lee | G06F 3/0481 715/846 |
| 2014/0321834 | A1* | 10/2014 | Segal | H04N 5/265 386/282 |
| 2015/0089393 | A1* | 3/2015 | Zhang | H04N 7/142 715/753 |
| 2015/0121225 | A1* | 4/2015 | Somasundaram | H04N 21/42224 715/721 |
| 2016/0142471 | A1* | 5/2016 | Tse | G06F 3/0488 715/753 |
| 2017/0039867 | A1* | 2/2017 | Fieldman | G09B 5/065 |

FOREIGN PATENT DOCUMENTS

IN                36/2012          9/2012
WO         2010057106 A2     5/2010

\* cited by examiner

INTERACTIVE PRESENTATION CONTROLS

CROSS REFERENCE TO RELATED APPLICATIONS

This application claims priority to U.S. Provisional Patent Application No. 62/279,452, filed on Jan. 15, 2016, and entitled "INTERACTIVE PRESENTATION CONTROLS."

BACKGROUND

Presentation technology generally known as an "interactive whiteboard" continues to replace conventional blackboards and whiteboards in classrooms and conference rooms. The interactive whiteboard can display presentation topics and other materials in a range of formats, and can receive control inputs to support interaction by participants in real time. An interactive whiteboard is a computer system having a display device that presents content on a large screen or surface, and an input device that responds to commands from at least the presenter. Typically, the input device is responsive to the presenter's gestures, such as by contact or other interaction of the presenter's finger or a stylus with a detector on the display surface. The computer system can additionally retrieve, store, and update content, send data to participants' personal devices, and communicate with remote devices such as content servers.

Interactive whiteboard systems are commonly used in presentation environments to facilitate transfers of information from the presenter to participants, as well as between participants. The interactive whiteboard provides a convenient surface on which concepts can be graphically expressed and interacted with. In some settings the presenter needs to maintain control of the content being displayed during the presentation, such as to move forward or backward in the presentation, to jump between non-consecutive screens, or to access additional content. However, the presenter may also need to take care not to obfuscate the display; in particular, the "board" (i.e., display screen) may be very large and the presenter may nearly always be positioned at the left edge or right edge of the board. It would be advantageous to provide control interfaces that are readily accessible at the presenter's location and that interfere with the displayed content as little as possible.

BRIEF DESCRIPTION OF DRAWINGS

The detailed description is set forth with reference to the accompanying drawings. The use of the same reference numbers in different figures indicates similar or identical items or features. Various embodiments in accordance with the present disclosure will be described with reference to the drawings, in which.

DETAILED DESCRIPTION

Figure 1:
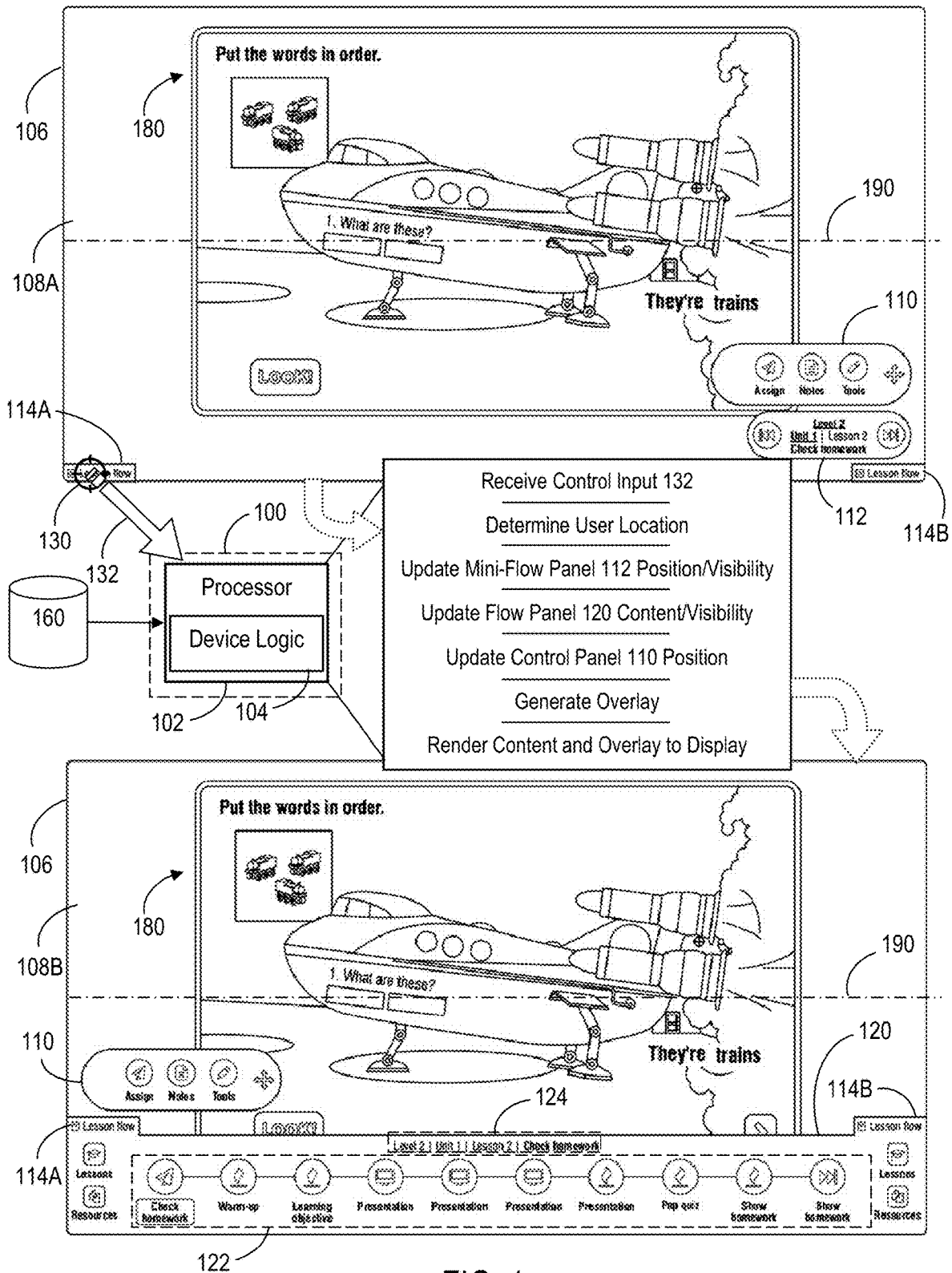
FIG. 1 is a diagram of an example system configured to provide a control interface for content presentations, in accordance with the present disclosure.

The present disclosure provides systems, device configurations, and processes for displaying presentation control interfaces as overlays of content being displayed by an interactive whiteboard computing system in an interactive presentation environment. A presentation control interface in accordance with the present disclosure may include one or more panels displaying informational and/or selectable icons that enable a presenter using the interactive whiteboard to perform various control tasks, non-limiting examples of which include: view a sequence of the presentation and the present position within the sequence; change to a different position in the sequence; input data to be stored in connection with the presentation; find and load other content; interact, or cause the computing system to interact, with other devices in communication with the computing system; and the like. Processes are provided for automatically showing, hiding, and/or repositioning control interface panels so that they are accessible by the presenter without substantially interfering with, or causing the presenter to interfere with, the presentation.

Implementations described in detail herein generate and display control interfaces for topic packages that contain structured information to be presented to participants in any presentation environment, such as corporate conference rooms, presentation halls, classrooms, residences, and the like. A topic package may be a hierarchical arrangement of related materials organized into smaller and more focused subtopics. At one or more levels of the hierarchy, the subtopics may be intended for presentation sequentially; the control interfaces may display this sequence, or "topic flow," and enable the presenter to view, manipulate, and move to a different position in the topic flow, as described below. In the illustrated examples, the topic package is a lesson package that defines part or all of a class curricula. An exemplary lesson package may have a level that identifies the age or grade, followed by a sequential or non-sequential plurality of units each pertaining to a different topic to be taught; each unit may include a series of lessons, and each lesson may include a plurality of activities arranged according to a lesson plan, referred to herein as a "lesson flow."

Each subtopic (e.g., lesson and/or activity) may have content associated therewith, which is displayed by the interactive whiteboard to enable the presenter to present the subtopic. The content may be static or dynamic, and may be interactive (i.e., the presenter or the participants may manipulate displayed content using an input device). The content may further include resources that are optionally displayed or not displayed, such as survey materials, testing materials, extended informational materials such as media files, custom data entered by the presenter, and the like. The present system may enable the presenter to access the resources during the presentation using the control interface. Each subtopic (e.g., activity of the lesson package) may have other properties that can be managed with the control interfaces. In some embodiments, one or more of the subtopics may be assignable to one or more of the participants, and the present systems and processes enable the presenter to use the interactive whiteboard to assign the subtopic to the participants.

Typically, the display by the interactive whiteboard covers a large area, and the presenter is almost always at either the left edge or the right edge of the area so that the participants can see the display. The present control interfaces account for the presenter's location and show, hide, and move the control interface panels so they are easily accessible from the presenter's location. Furthermore, the control interfaces position the panels within the lower half of the display so they are within reach of presenters of any height.

Referring to FIG. 1, a computing device 100 of an interactive whiteboard computing system in accordance with the present disclosure includes a processor 102 that executes device logic 104 within the processor 102 or contained in memory of the computing device 100. The device logic 104 configures the processor 102 to perform the processes described herein. The computing device 100 is in communication with a display device 106 for displaying the presentation content, and with an input device (see FIG. 2) for receiving user input. The computing device 100 may also include or communicate with one or more content data stores 160 that contain topic packages and may further contain other data related to the presentation environment, such as participant or presenter data.

To illustrate exemplary processes of the system, FIG. 1 shows the display device 106 displaying a first frame 108A including content 180 from an activity of an exemplary lesson package, and a control interface overlaying the activity's content 180. The control interface of the first frame 108A includes a control panel 110 and a minimized flow ("mini-flow") panel 112 near the right edge of the first frame 108A, and lesson flow access buttons 114A, 114B in the lower corners of the first frame 108A. Each element of the control interface appears below the vertical midpoint of the first frame 108A, identified by line 190. A user input 130 on the left lesson flow access button 114A causes the processor 102 to receive from the input device a control input 132 representing the user input.

From the control input 132, the processor 102 may determine that the user has selected one of the lesson flow access buttons 114A-B. Selecting one of these buttons 114A-B replaces the mini-flow panel 112 with a full lesson flow panel 120 in the overlay containing the control interface. That is, in some embodiments, if the mini-flow panel 112 is visible, the lesson flow panel 120 is hidden, and vice versa. Thus, if the mini-flow panel 112 is visible when the user input 130 selecting one of the lesson flow access buttons 114A-B is received, the processor 102 updates the control interface by changing the mini-flow panel 112 visibility parameter to hidden and changing the lesson flow panel 120 visibility parameter to visible. Further, the processor 102 may determine that the user has selected the left lesson flow access button 114A and is therefore standing at the left edge of the first frame 108A. The processor 102 may update the control panel 110 and mini-flow panel 112 positions by moving the control panel 110 and the mini-flow panel 112 from the right edge of the overlay to the left edge thereof (or keeping the control panel 110 and the mini-flow panel 112 at the left edge if they are already there). The processor 102 may also move the control panel 110 and the lesson flow access buttons 114A-B vertically to position them slightly above the lesson flow panel 120.

The processor 102 may then re-generate the overlay containing the control interface with the updated panels, and may render the content and the overlay to the display device 106 as described further below. The display device 106 then displays a second frame 108B showing the lesson flow panel 120 at the bottom of the second frame 108B, further showing the control panel 110 and lesson flow access buttons 114A-B in their new positions, and hiding the mini-flow panel 112. The lesson flow panel 120 may include, among other elements, an activity display 122 showing the progression of activities in the lesson and a linked trail 124 showing the lesson package hierarchy above the current activity, as described further below. A second user input selecting the left lesson flow access button 114A may collapse the lesson flow panel 120 (i.e., hide the lesson flow panel 120 and move the control panel 110 and lesson flow access buttons 114A-B downward) and show the mini-flow panel 112 in its new position at the left edge of the second frame 108B. A second user input selecting the right less flow access button 114B may collapse the lesson flow panel 120, move the control panel 110 and mini-flow panel 112 back to the right edge of the second frame 108B, and then show the mini-flow panel 112.

Figure 2A:
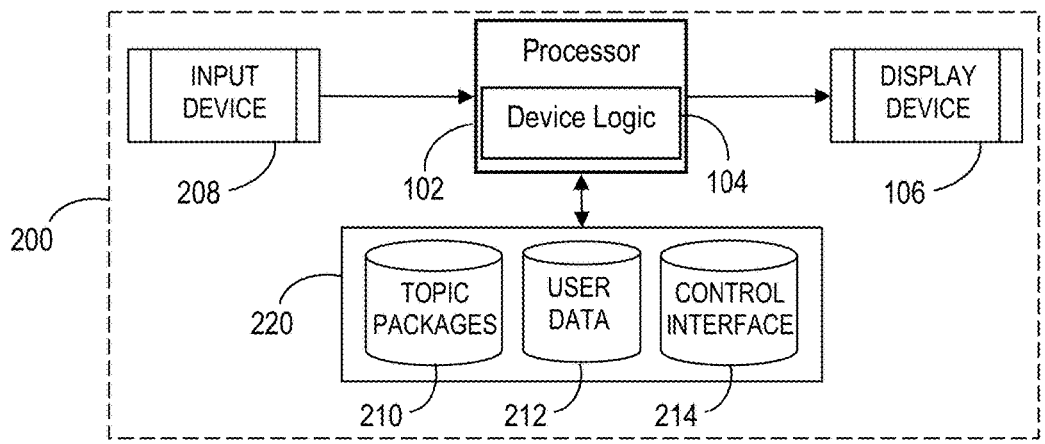
FIGS. 2A-C are diagrams of exemplary computing devices implementing the present systems and methods.
Figure 2B:
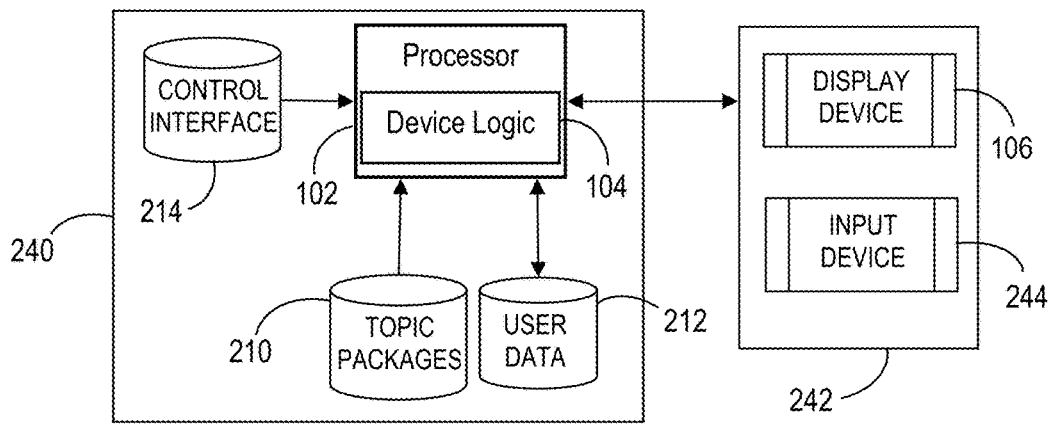
Figure 2C:
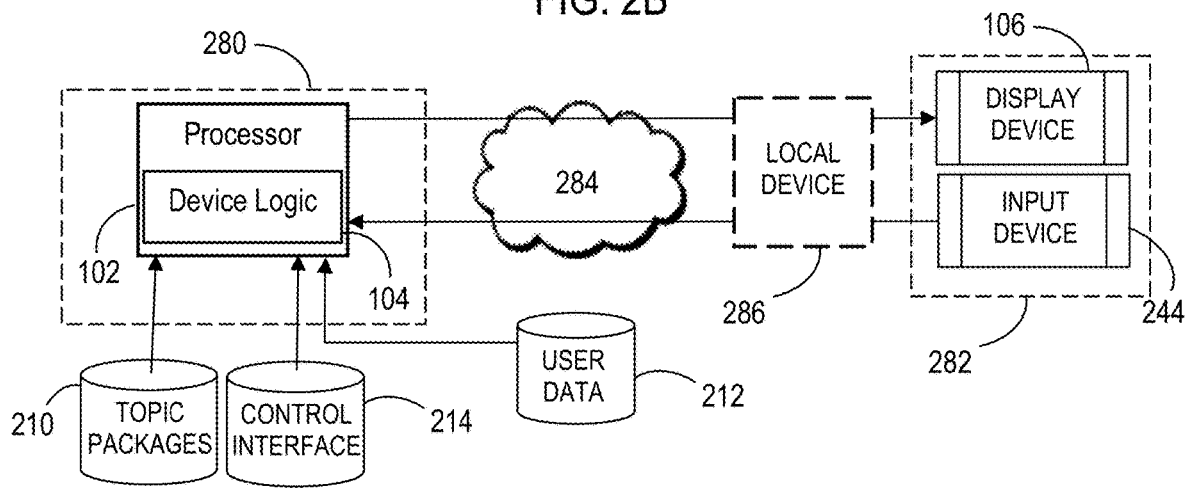

FIGS. 2A-C illustrate non-limiting, exemplary implementations of an interactive whiteboard computing system in accordance with the present disclosure. Generally, a computing device implementing some or all of the interactive whiteboard system (e.g., computing devices 100 of FIG. 1, 200 of FIG. 2A, 240 of FIG. 2B, and 280 of FIG. 2C) may be a server computer or a system of interconnected server computers, such as a web server, application server, application platform, virtual server, cloud data server, and the like, a personal computer, laptop computer, tablet computer, e-reader, smartphone, personal data assistant, set-top box, digital media player, microconsole, home automation system, or similar computing device having, as the processor 102, a central processing unit (CPU), microprocessor, or other suitable processor. Referring to FIG. 2A, the computing device 200 having the processor 102 may include the display device 106 and an input device 208 together as an integrated unit. In some embodiments, the display device 106 may be a liquid crystal display, a plasma display, or another suitable flat panel digital display that receives image data from the processor 102 and displays the image data on a screen. In other embodiments, the display device 106 may include a display surface, such as a whiteboard, and a digital projector that receives the image data from the processor 102 and projects the image data onto the display surface.

The input device 208 may be a touch- and/or proximity-sensitive sensing surface. Non-limiting examples of suitable implementations include: an infrared scanning system that projects infrared light over the display surface and detects interference with the light; a capacitive or resistive touch panel or membrane positioned over the display surface; an electromagnetic pen-based system that includes an array of wires embedded in the display surface and a stylus containing a coil that affects the flow of electric current in the wires based on the pen's location and proximity to the display surface; and, an infrared light-detecting camera that detects the position of an infrared light-emitting stylus held by the presenter. In some embodiments, the input device 208 may be integrated into the display device 106, such as in a capacitive sensing flat panel touch screen. Additionally or alternatively, the input device 208 may include a keyboard, keypad, mouse, camera, microphone, or other suitable input device integrated into the computing device 200.

The processor 102 may access one or more data stores to generate and render images, among other tasks. Generally as used herein, a data store may be any repository of information that is or can be made freely or securely accessible by the processor 102. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each of the data stores may be temporary or permanently implemented.

The computing device 200 may include a topic packages data store 210, a user data store 212, and resources 214 for generating the control interfaces, each stored in the device logic 104 or elsewhere in the computing device 200, such as in volatile or non-volatile memory 220, on one or more hard drives, or on removable media such as a CD-ROM or flash drive. The topic packages data store 210 may include topic packages stored in a format that the processor 102 is configured, by the device logic 104 or otherwise, to process. In some embodiments, the topic packages may be stored and/or organized as a website or similar structured document. In other embodiments, the topic packages may be stored as content assets which are accessed by one or more executable software programs.

In some embodiments, the device logic 104 includes program instructions that the processor 102 executes to generate a graphic user interface (GUI) from data in a stored topic package and from control interface resources, render the GUI to the display device 106 (e.g., for display as a frame), and coordinate the GUI with the input device 208 so that user input can be properly interpreted. Thus, the data for a stored topic package may include GUI data that the processor 102 uses to generate the GUI. The GUI data may include: content data in the form of images, audio clips, and other media files or references thereto, which the processor 102 renders for display; for some elements of content data, interaction data that the processor 102 uses to identify regions on the display surface that can validly receive user input when the associated content data is displayed, and to process any such user input; relational data that creates associations between elements of content data, such as sequential or subject matter relationships; data controls that instruct the processor 102 when and where to store data input by the user; and other structural data that the processor 102 may use to generate the GUI and interact with the user. In some embodiments, the topic packages may include data structure files in a markup language such as HTML or XML, the data structure files including one or more of the relational data, the data controls, and the other structural data.

The user data store 212 may include data related to the presentation environment. In some embodiments, the user data store 212 may store information about one or more presenters, and/or about the computing device 200 or the room in which it is located, and/or about one or more participants (e.g., students in one or more of the classes that meet in the associated classroom). The user data store 212 may further store values for settings such as user preferences related to the processor's 102 execution of software, or related to hardware settings for the computing device 200, such as display properties, volume, and the like. The processor 102 may use data in the user data store 212 to generate the GUI and to interact with the user. The processor 102 may additionally or alternatively store data entered via the input device 208 into the user data store 212.

The control interface resources 214 may include program instructions, content (e.g., graphical representations of control panels), and other resources, files, source code, and the like, which pertain to the processor's 102 implementation of the control interfaces described herein. The control interface resources 214 may be stored as a standalone data store in the device logic 104, memory 220, or elsewhere in the digital storage of the computing device 200, or the control interface resources may be stored within the topic packages data store 210, the user data store 212, or another data store. The control interface resources 214 may be created and stored in any suitable format; in some embodiments, the control interface resources 214 may be a combination of media files (e.g., bitmaps and/or other image files, MOV and/or other video files, audio files, and the like), HTML or other markup language documents, and JavaScript or other scripts, stored in an asset repository for a web application executed by the processor 102. The processor 102 accesses, executes, and/or processes these resources 214 to generate the overlay containing the control interface that is suitable for the topic package being presented. The generation and rendering processes are described further below.

Referring to FIG. 2B, another embodiment of a computing device 240 operates as described above for computing devices 100 of FIG. 1 and 200 of FIG. 2A. In contrast to the computing device 200, the computing device 240 may not have an integrated display device 106 and input device 244. Rather, the computing device 240 may be physically separated but in communication with the display device 106 and the input device 244. In an exemplary implementation, the computing device 240 may be a desktop, laptop, thin client, tablet computer, or other personal computing device, and may communicate, using any suitable wired or wireless connection and protocol, with an interactive whiteboard device 242 that integrates the display device 106 with the input device 244. Examples of such an interactive whiteboard device 242 are described above, and include a flat panel touchscreen display connected to the computing device 240. In another embodiment, the display device 106 and the input device 244 may not be physically integrated but may directly cooperate; for example, the display device 106 may be a digital projector connected to the video output of the computing device 240, and the input device 244 may be an infrared scanning system connected to the input of the computing device 240 and disposed over a surface onto which the projector projects images.

In still another embodiment, the display device 106 may be separate from the input device 244. For example, the display device 106 may be a digital projector connected to the video output of the computing device 240, and the input device 244 may be a keyboard, mouse, remote control, microphone, or other non-position-sensing input device connected to the input of the computing device 240. In such an embodiment, where the user does not need to be able to physically touch the elements of the control interface, it may be less important to move the panels to a convenient position. However, the content of the panels may still be easier for the user to read if they are closer, so the processor 102 may still advantageously implement a control interface in which the buttons themselves indicate the user's location, as described further below. Furthermore, the advantages of a topic flow panel, described herein in connection with the illustrated lesson flow panel, are uncompromised whether or not any panels are moved, so the benefits of the present control interfaces remain. Finally, in such an embodiment, the data stores 210, 212 and control interface resources may be provided on a CD-ROM or other physical media, so that the presently disclosed systems and methods can be implemented on existing, relatively rudimentary presentation systems that may be attached to a desktop computer that has no interne access.

For example, as noted above, the topic packages data store 210, the user data store 212, the resources 214 for generating the control interfaces, and even the device logic 104, may be stored on a removable media. In some embodiments, this removable media may include a USB device. Thus, the USB device may be coupled to the processor, 102, the display device 106, and/or the input device 208 to provide the data stores 210, 212, the resources 214 for generating the control interfaces, and/or the device logic 104. In these embodiments, the presently disclosed systems and methods may be implemented on existing, relatively rudimentary presentation system that may be attached to a desktop computer that has no access to any computer networks. Furthermore, these embodiments may include any configuration of the disclosed environment, and may therefore be applied to any of the environments demonstrated in FIG. 1, or 2A-2C.

Referring to FIG. 2C, another embodiment of a computing device 280 operates as described above for computing devices 100 of FIG. 1, 200 of FIG. 2A, and 240 of FIG. 2B; further, the computing device 280 is adapted to function as a remote server communicating, in some embodiments, with the interactive whiteboard device 282 (described above with respect to element 242 of FIG. 2B) over the Internet, an intranet, or another wide-area or local computer network 284. Additionally or alternatively, the computing device 280 may communicate over the network 284 with a local device 286 that has a wired or wireless connection to the display device 106 and the input device 244. Thus, in one embodiment, the computing device 280 may be a web server or a group of web servers that hosts the content (i.e., topic packages) from the topic package data store 210 (which, along with the user data store 212, may be disposed on or remote from the computing device 280) as websites or interlinked web pages, and the local device 286 may be a personal computer having a browser application that the user directs to a URL of the desired topic package. In another embodiment, the computing device 280 may be an application or web application server that serves the topic packages. The local device 286 or the interactive whiteboard device 282 may have a client-side application installed and/or may use an application program interface (API), which alone or in combination configure the local device 286 or the interactive whiteboard device 282 to communicate with the computing device 280, in particular to receive the GUI generated by the processor 102 and to send user input and/or associated control signals to the processor 102.

FIGS. 3A-G illustrate example GUI frames that include a control interface overlaid upon interactive content from a lesson package. In various embodiments, the processor 102 of any of the systems (i.e., computing device 100, 200, 240, 280) described above may execute its corresponding device logic 104 to perform any or a combination of the methods herein (e.g., method 400 of FIG. 4, described below) to produce the GUI frames and then respond to input data generated by a user interacting with the GUI frames. A GUI frame may be generated in any electronic data format that is suitable for the overall presentation framework. In some non-limiting exemplary embodiments, the GUI frame may be one or more of: a web page, such as a HTML or dynamic HTML (e.g., HTML5) document or group of linked documents, to be included in a website or another web page (e.g., for the lesson package); a server-side or client-side scripted web resource, using JavaScript, PHP, ASP.NET, or another suitable web scripting language; a frame or group of frames in an ADOBE FLASH document; a slide or group of linked slides for use in a presentation software such as POWERPOINT; a screen or series of screens of rendered graphics within an executable software program; and the like.

Figure 3A:
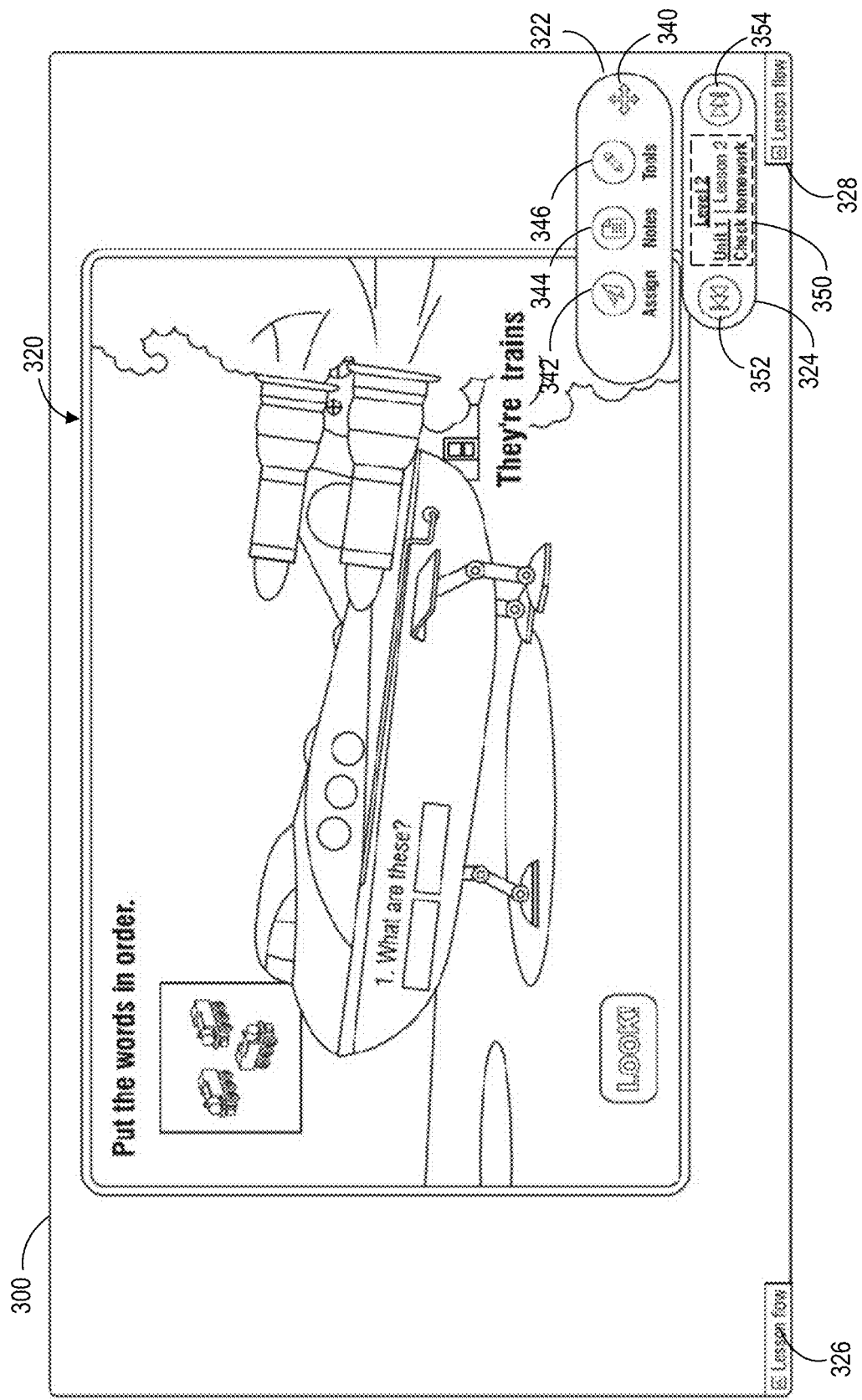
FIGS. 3A-G are diagrams illustrating exemplary graphic user interfaces that include the control interfaces of the present disclosure.
Figure 3B:
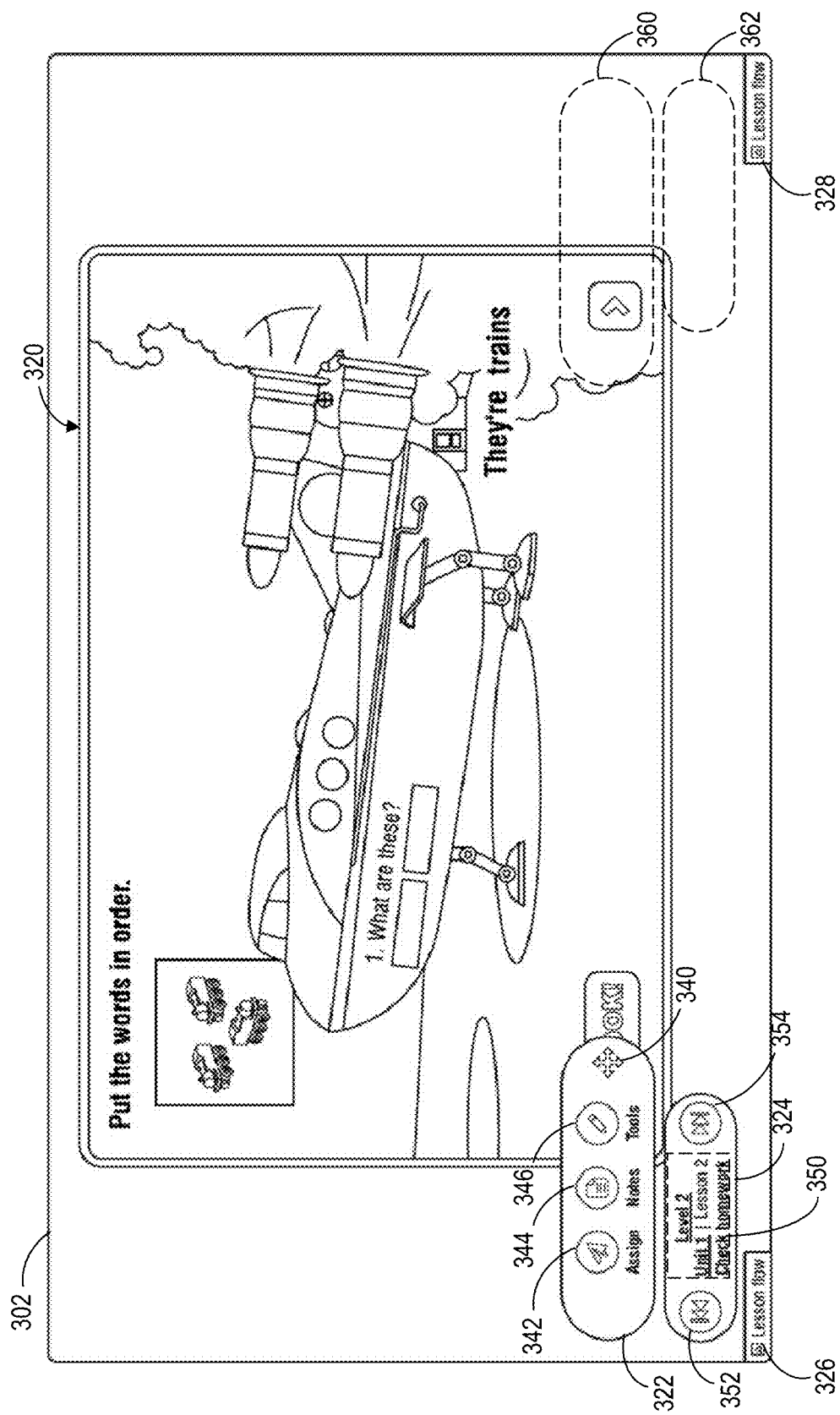

Referring to FIG. 3A, GUI frame 300 corresponds to the first frame 108A of FIG. 1, and the functionality in GUI frame 300 is partially described above. The GUI frame 300 includes content 320 rendered from the content data of the lesson package that corresponds to the current location within the lesson flow. The content 320 may include static or moving images, audio, interactive elements (buttons, text fields, manipulable images, and the like), and other content. The control interface is visually represented by the control panel 322, the mini-flow panel 324, the left lesson flow access button 326, and the right lesson flow access button 328. The position of the control panel 322 and the mini-flow panel 324 at the right edge of the GUI frame 300 indicates that the most recent localization of a user by the processor 102 signalled that the user was at or near the right edge of the presentation area (though in some embodiments, the control panel 322 and mini-flow panel 324 may be located at the right edge by default). FIG. 3B illustrates a GUI frame 302 generated by the processor 102 after the processor detects that the user has moved to the left edge of the presentation area; the control panel 322 and the mini-flow panel 324 are moved from their previous locations 360, 362 to the left edge of the GUI frame 302. The processor 102 may animate such movement by continually or periodically updating the control interface and rendering new GUI frames, as described below, to show the panels 322, 324 moving.

The control panel 322 may include selectable items (e.g., buttons or icons) for performing various control tasks for the presentation. Each of the selectable items may generate a control input, as described below, when selected. The illustrated exemplary control panel 322 includes a move icon 340, an assign icon 342, a notes icon 344, and a tools icon 346 that are each selectable; other controls may be presented, and the user (i.e., the presenter) may set preferences for the controls that appear. The icons 340-346, and any other selectable icons described herein, may be large enough to see clearly from the back of the presentation room (e.g., classroom), and may conform to an iconography that informs a viewer of the icon's function even when the viewer is not close enough to read associated text.

The move icon 340, when selected, enables the user to move the control panel 322 to another location in the GUI frame 300 using a gesture, a cursor, a pointing device, voice commands, or another means of input. The processor 102 may animate such movement by continually or periodically updating the control interface and rendering new GUI frames, as described below, while the control panel 322 is being moved. The assign icon 342, when selected may perform or enable the user to perform a particular assignment task, or may activate a menu of assignment tasks. In one example, selecting the assign icon 342 enables the user to send working materials, stored as data in the lesson package and associated with the activity displayed in the GUI frame 300, to one or more student devices in communication with the processor 102 (or with the interactive whiteboard device 282 or the local device 286 of FIG. 2C). The notes icon 344 may activate the notes panel, described below with respect to FIG. 3E. The tools icon 346, when selected, may activate a tools subpanel, described below with respect to FIG. 3F.

The mini-flow panel 324 includes a linked trail region 350 containing text that conveys information about the current position of the presentation within the lesson flow. The linked trail region 350 may identify the current activity, and may further provide a trail, known as a navigation breadcrumb in web design, showing the previous positions visited or the parent nodes of the current activity. Each of the entries in the trail may be selectable and may link to the corresponding position or node; thus, selecting an entry generates a control input instructing the processor 102 to load the corresponding position or node. The mini-flow panel 324 may further include a skip backward button 352 and a skip forward button 354 for moving the presentation to the previous or the next activity, respectively, in the lesson flow.

Figure 3C:
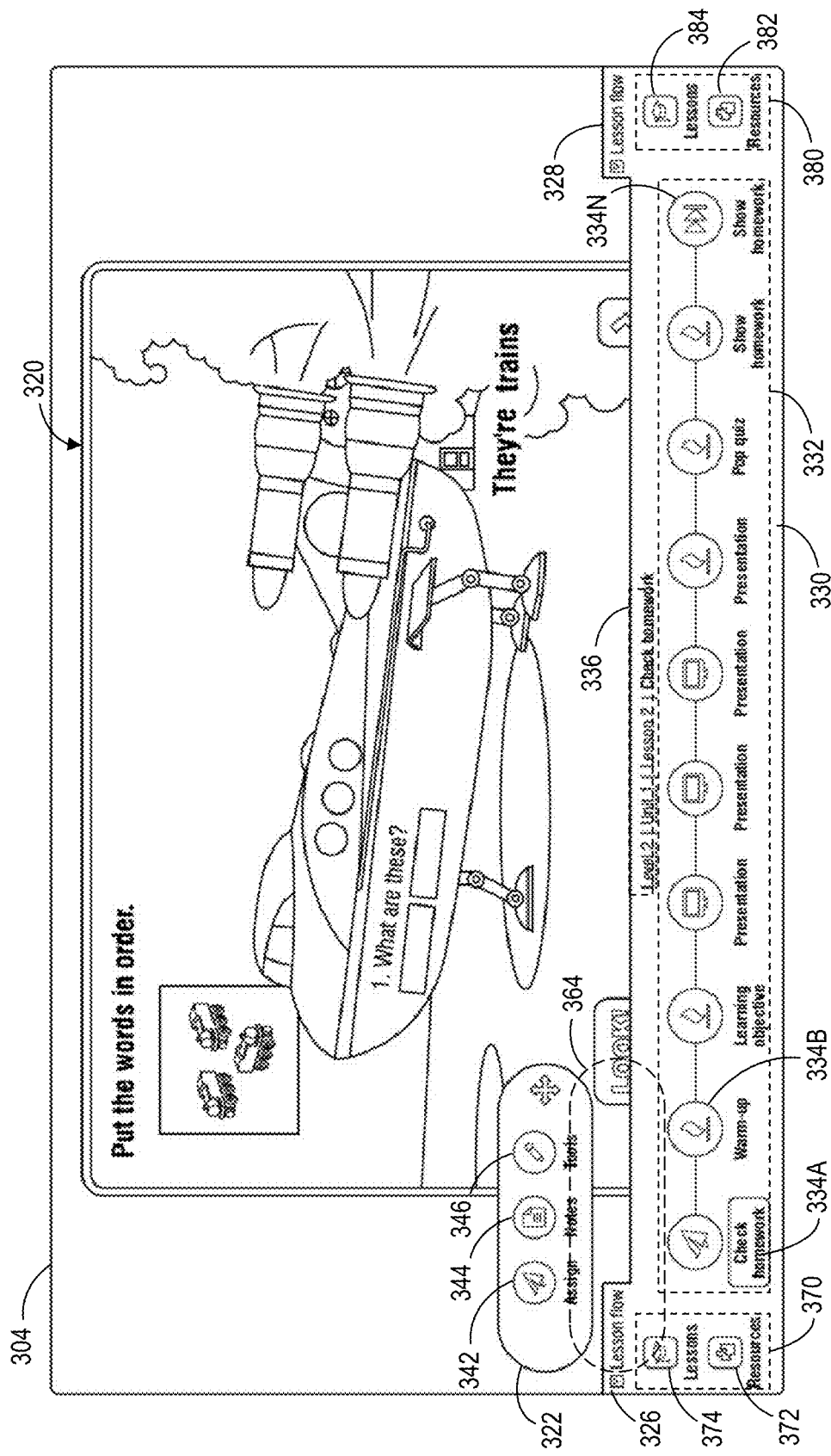
Figure 3D:
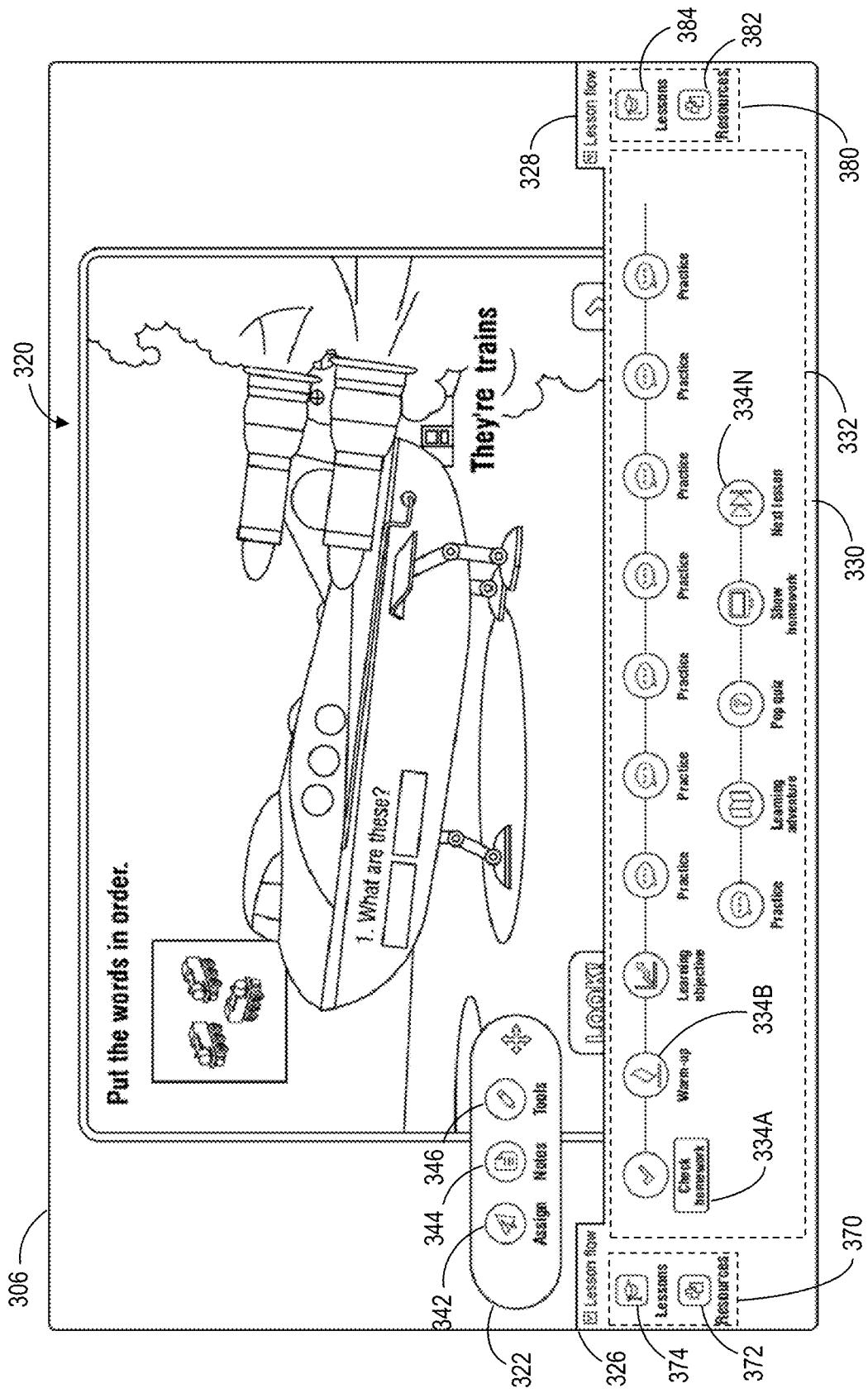

The left lesson flow access button 326 and the right lesson flow access button 328 correspond to the left flow access button 114A and the right lesson flow access button 114B, respectively, of FIG. 1, and their operations to activate the lesson flow panel are described above. FIG. 3C illustrates a GUI frame 304 rendered by the processor 102 after receiving a control input indicating the user selected the left lesson flow access button 326. The lesson flow panel 330 is rendered visible at the bottom of the GUI frame 304. The lesson flow access buttons 326, 328 are moved vertically upwards (e.g., from previous position 364) to accomodate the lesson flow panel 330. The processor 102 may animate such movement by continually or periodically updating the control interface and rendering new GUI frames, as described below, to show the panels moving as the lesson flow panel 330 expands or rises from the bottom edge of the GUI frame 304.

The lesson flow panel 330 may include an activity progression element 332 in a prominent location (i.e., centered and made large) of the panel 330. The activity progression element 332 may show visual representations of all or a portion of the sequence of activities in the present lesson. According to the visual representation of each activity, the activities may be arranged horizontally in sequence; when there are more activities than fit in a single row spanning the width of the activity progression element 332, the height of the lesson flow panel 330 may be increased and a second (and third, and so on) row of activities may be displayed, as shown by the GUI frame 306 of FIG. 3D. In some embodiments, each activity may be represented by an activity icon 334A, 334B, . . . , 334N and the title of the activity. The activity icon 334A, 334B, . . . , 334N may indicate a type of the activity (e.g., assignment, class exercise, presentation, quiz). The activity icon for the present activity may be visually emphasized.

Each activity icon 334A-N may be selectable for performing one or more related control tasks. In one example, selecting an activity icon 334A, 334B, . . . , 334N signals the processor 102 to load the corresponding activity. In another example, selecting an activity icon 334A, 334B, . . . , 334N modifies the control interface to display information about the corresponding activity. For example, when activity icon 334A is selected, the assign icon 342 and notes icon 344 of the control panel 322 are configured to perform control tasks related to the activity of activity icon 334A. Further, the activity corresponding to activity icon 334A being assignable to the students, the assign icon 342 may be active when activity icon 334A is selected; but, the activity corresponding to activity icon 334B being non-assignable, the assign icon 342 may be rendered unselectable or may disappear when activity icon 334B is selected. The last activity icon 334N may be associated with the final activity in the lesson; or, the last activity icon 334N may skip to the end of the lesson.

A linked trail element 336 of the lesson flow panel 330 may include a linked (i.e., breadcrumb) trail to the current activity, as described above with respect to elements 124 of FIG. 1 and 350 of FIG. 3A. The lesson flow panel 330 may further include materials access elements 370, 380 at the left and right edges of the GUI frame 304, such that a user standing at either edge of the corresponding presentation area may easily select the selectable items therein. The materials access element(s) 370, 380 may provide selectable items for accessing other content of the lesson package via control menus that the processor 102 renders to the screen in response to a corresponding control input. In some embodiments, a resources icon 372, 382 activates a resources menu as shown in FIG. 3G and described below. In some embodiments, a lessons icon 374, 384 activates a lessons menu that presents some or all of the lessons in the lesson package, and may be in a format similar to that of the resources menu shown in FIG. 3G.

Figure 3E:
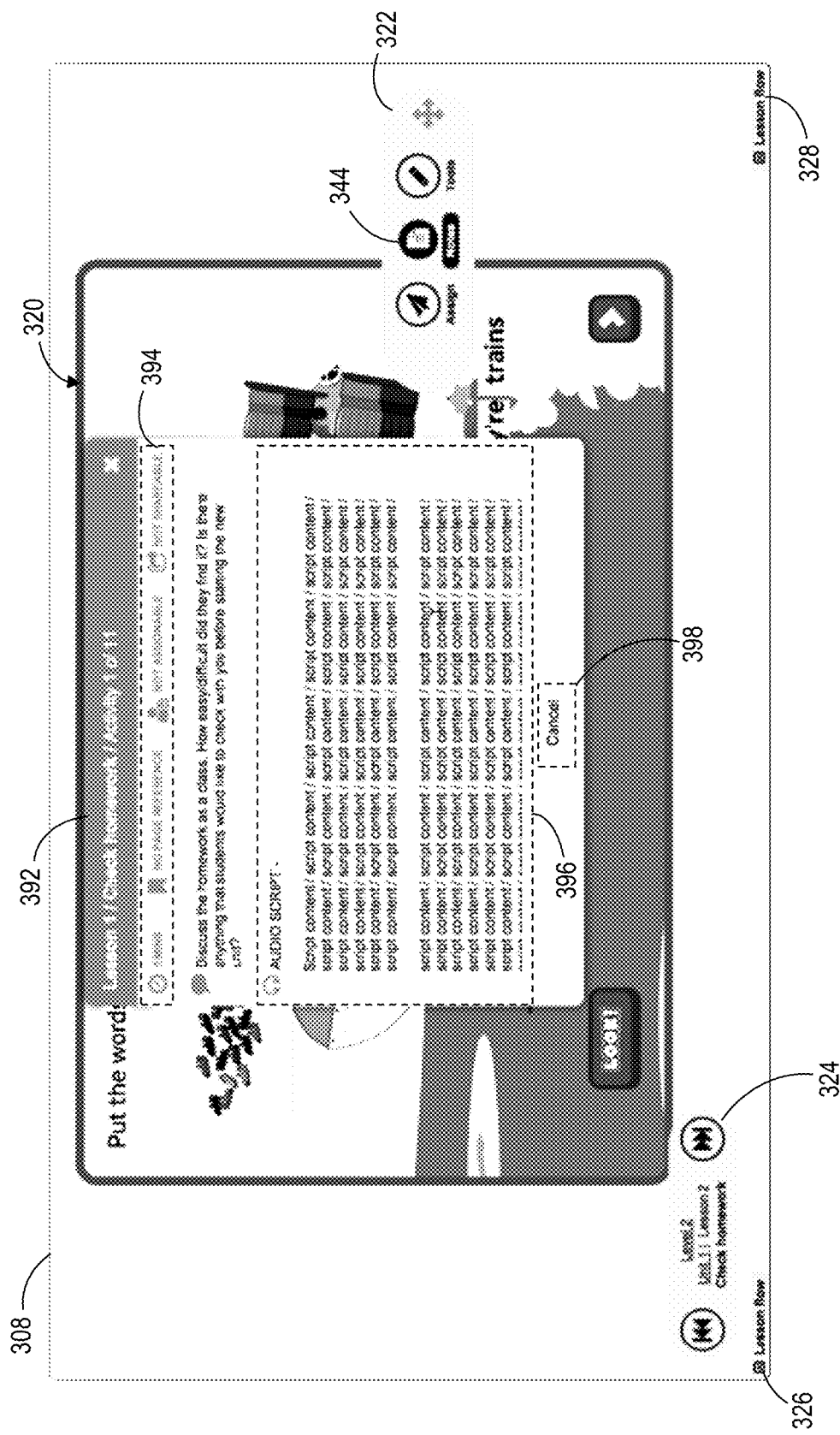

FIG. 3E illustrates a GUI frame 308 that the processor 102 renders in response to a control input selecting the notes icon 344 on the control panel 322. A notes control box 392 associated with the current or selected activity displays various details about the activity. In some embodiments, the notes control box 392 may include a summary bar 394 providing overview information such as the expected duration of the activity, the assignability of the activity, and other information. In some embodiments, the notes control box 392 may further display data entered by a user (e.g., the teacher) and may provide text fields to enter additional data. In some embodiments, when the activity includes audio content the notes control box 392 may include a script element 396 that displays a transcription of the audio content. A cancel box 398 closes the notes control box 392 and returns the GUI to the presentation. At least one control element, such as the cancel box 398, may be rendered to the bottom portion (e.g., the bottom half) of the GUI frame 308 so as to be accessible (i.e., reachable) by presenters of any height.

Figure 3F:
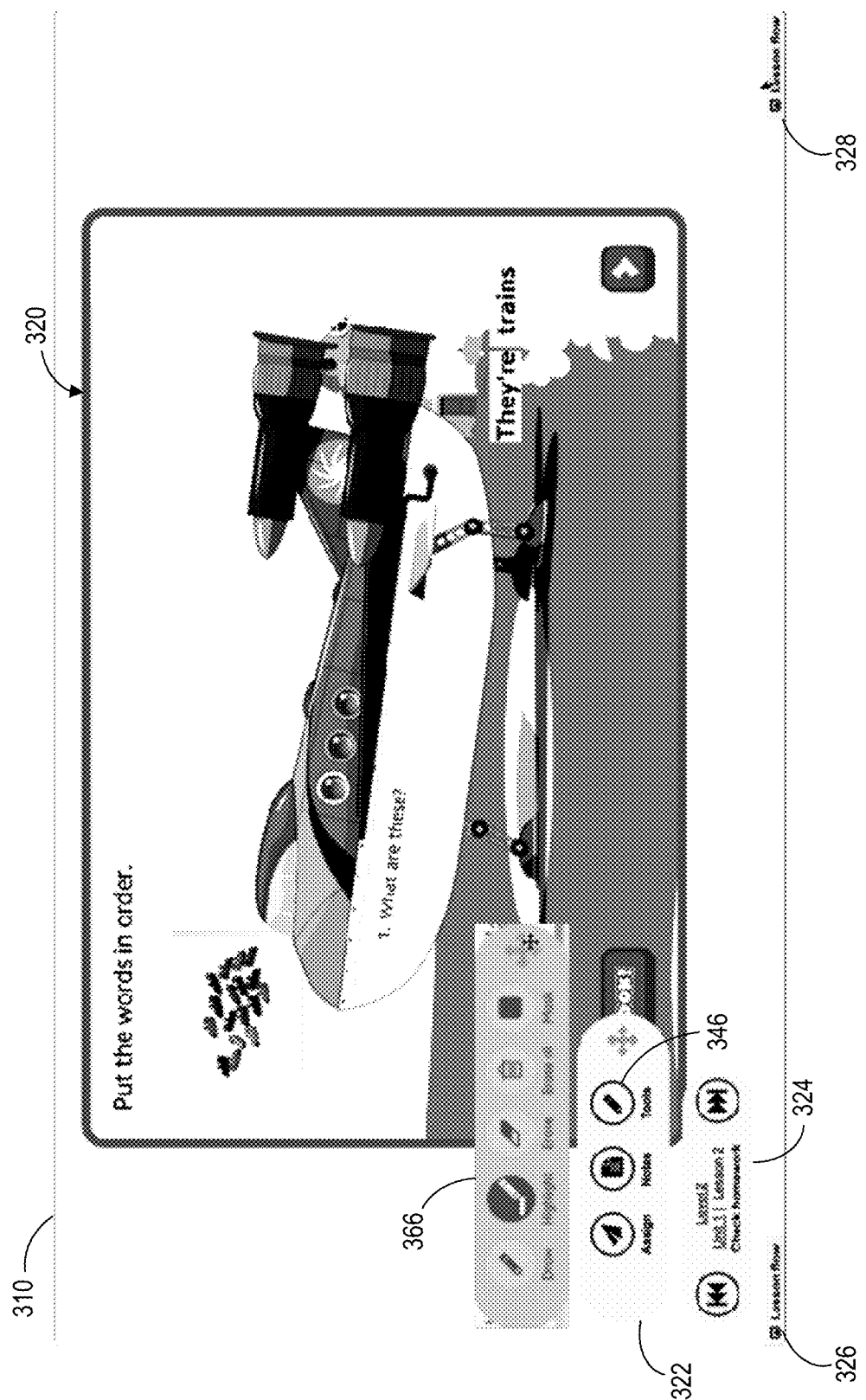
Figure 3G:
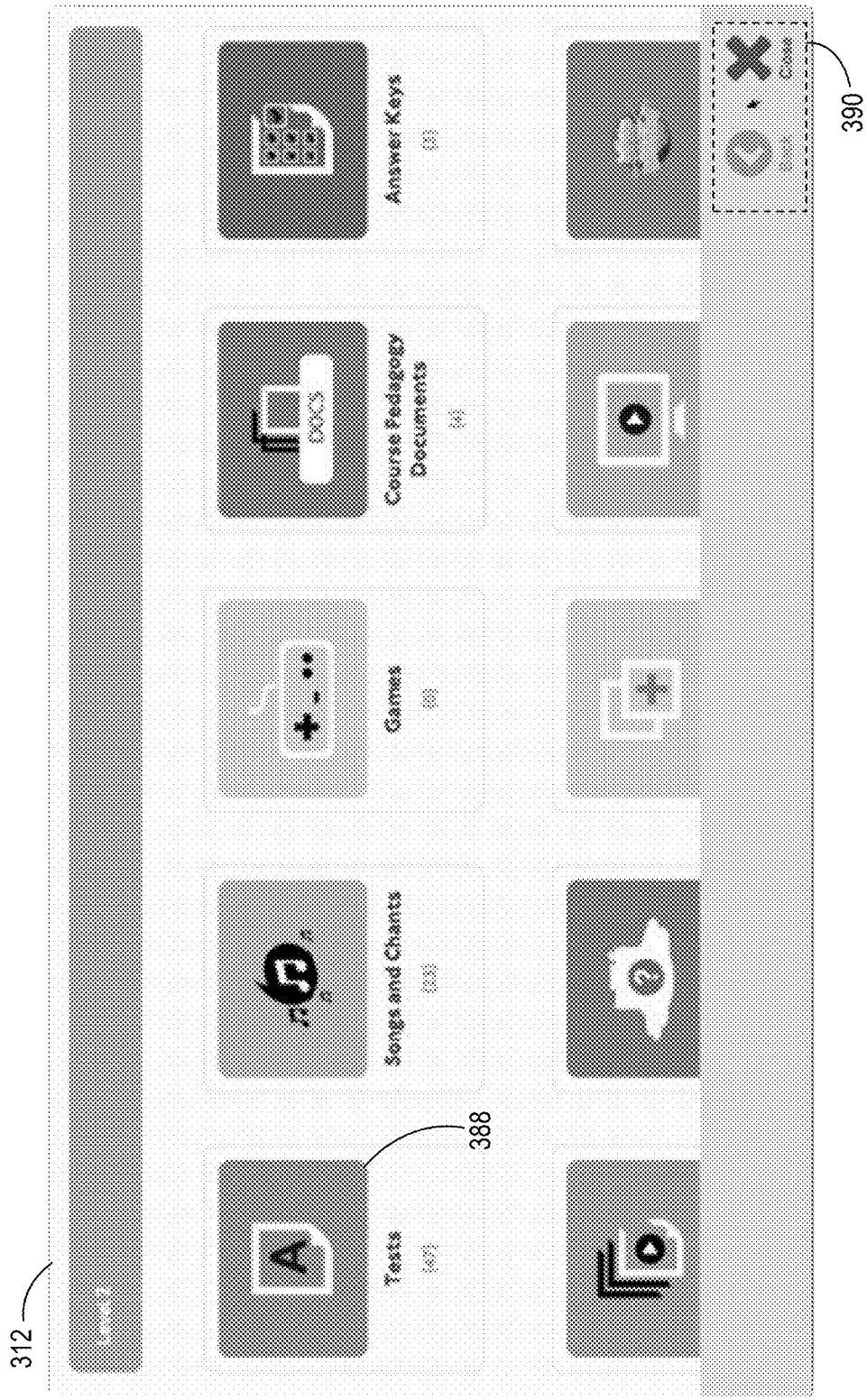

FIG. 3F illustrates a GUI frame 310 that the processor 102 renders in response to a control input selecting the tools icon 346 on the control panel 322. When the tools icon 346 is selected, a tools subpanel 366 may become visible in the GUI frame 310 approximate the control panel 322. The tools subpanel 366 may provide a plurality of selectable items that each enable a different tool for modifying the appearance of the GUI frame 310. Exemplary tools include a pencil or marker for making opaque marks on the GUI frame 310, a highlighter for making translucent, colored marks, a text tool for adding text, a selection tool for selecting a portion of the content 320 (e.g., for copying), a mask tool for drawing temporary opaque boxes over portions of the content 320 to obscure them, and the like.

FIG. 3G illustrates a GUI frame 312 consisting of a resources menu rendered by the processor 102 in response to a control input indicating that the resources icon was selected. The resources menu may include a plurality of folders and, optionally, subfolders that navigate to lesson package content associated with the activity, the lesson, the unit, etc. The folders may be arranged by content type or another suitable arrangement. The resources menu, and any other control menu generated by the processor 102, may include navigation buttons 390 that are displayed within the bottom half of the GUI frame 312 to make the navigation buttons 390 accessible (i.e., reachable) by presenters of any height. Similarly to other control interface elements (e.g., the control panel 322 and mini-flow panel 324), the navigation buttons 390 may be displayed at a position in the GUI frame 312 that corresponds to the location of the user, detected by the computing device. For example, the navigation buttons 390 for the resources menu may appear at the left edge when the user has selected the left resources icon 372 of FIG. 3B, and may appear at the right edge when the user has selected the right resources icon 382 of FIG. 3B.

Figure 4:
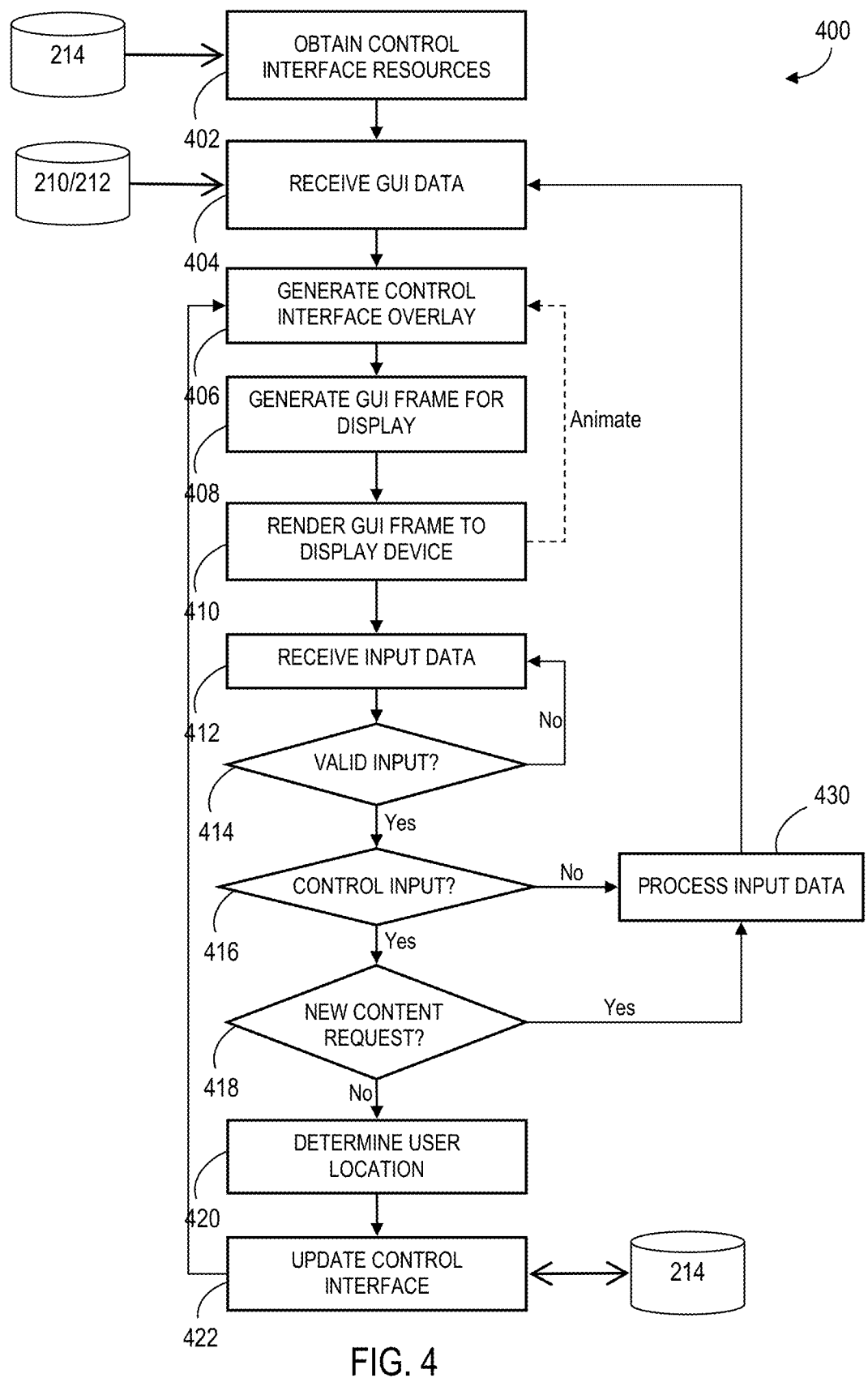
FIG. 4 is a flowchart of an example method of presenting a control interface and responding to input data generated by a user interacting with the control interface.

Referring to FIG. 4, the processor 102 may execute an exemplary method 400 of presenting a control interface for a presentation, and of responding to user interactions with the control interface. At step 402, the processor 102 may obtain the control interface resources (e.g., control interface resources 214 as described above). In some embodiments, the control interface resources 214 may include parameter values for a default state of the control interface, or for a current state of the control interface if the control interface has already been presented. For example, each of the panels (e.g., the control panel, mini-flow panel, lesson flow panel, and any subpanels, as described above) and menus (e.g., the resources menu, lessons menu, notes control box, etc., described above) of the control interface may have a visibility flag set to either visible or hidden to indicate whether the associated panel/menu is visible in the default or current state. Additionally, panels and menus that are moveable may have a location parameter that indicates the current location. The processor 102 may retrieve such parameters at step 402.

At step 404, the processor 102 may receive or obtain GUI data, such as from the topic package data store 210 and/or the user data store 212 described above. The GUI data includes the content data to be displayed and any related data needed to generate the control interface and GUI frame. At step 406, the processor 102 may generate the control interface overlay. The control interface overlay may be a graphic layer that contains the visible panels, menu, buttons, and other elements of the control interface and appears overlaid on top of the rendered content data in the GUI frame. The control interface overlay may be implemented in different ways, depending on the overall framework of the presentation; generally, the processor 102 may be understood to assign to the control interface overlay a higher priority or position in a stack order of graphic layers than is assigned to the content data. For example, if the presentation is a collection of HTML pages, the processor 102 may implement the stack order with cascading style sheets (CSS), assigning the overlay a higher z-index value than that of any layer of content data.

Figure 5:
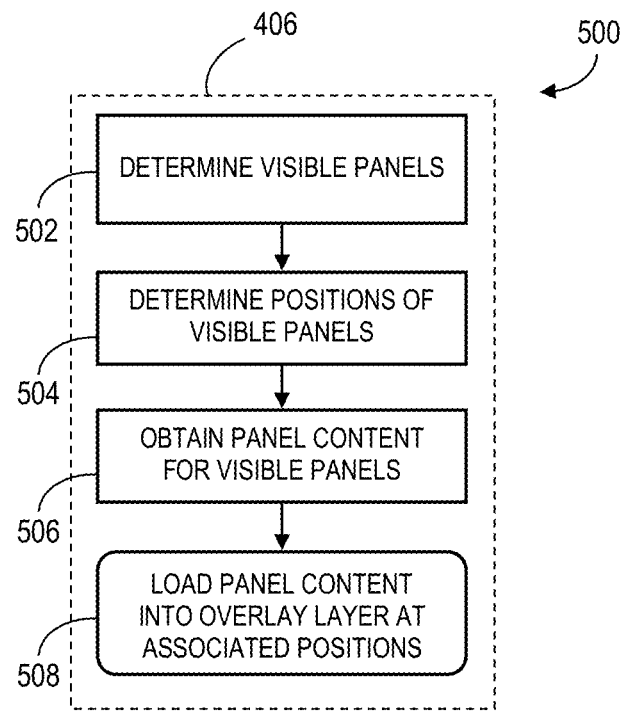
FIG. 5 is a flowchart of an example method of generating a graphical overlay containing a control interface.

FIG. 5 illustrates an exemplary method 500 of generating the control interface overlay (step 406 of FIG. 4). At step 502, the processor 102 may determine which panels and/or menus of the control interface are marked as visible, and at step 504 the processor 102 may determine the positions of any of the moveable panels/menus that are visible. In some embodiments, the position of a panel may be stored as a pixel location (e.g., coordinates of the top left corner of the panel). In other embodiments, the position of a panel may simply indicate whether the panel is on the left edge or right edge of the GUI frame, and the processor 102 may determine the actual location (e.g., pixel coordinates) where the panel should be placed based on which other panels and/or menus are visible. For example, the processor 102 may determine that the lesson flow panel is visible, and so may determine that the control panel, having a stored position on the right edge, is vertically located at a particular Y-coordinate that places the control panel slightly above the lesson flow panel. The particular Y-coordinate may be a default coordinate corresponding to a visible lesson flow panel, or may further be determined based on the height of the lesson flow panel. The processor 102 may also determine whether any of the visible control interface elements has a position that extends outside of a proscribed area of the GUI interface, such as the bottom half thereof, and may reposition elements to satisfy positioning requirements.

At step 506, the processor 102 may obtain the content for the visible panels, menus, and buttons. The content may include parameters found in the control interface resources 214, such as panel appearance (e.g., shape, dimensions, background color) and some or all of the selectable items (e.g., icons as described above) to be displayed. The content may further include topic package content data and/or selectable items determined therefrom. In one example, the processor 102 creates the linked (i.e., breadcrumb) trail displayed in the lesson flow panel or mini-flow panel from the lesson package hierarchy. In another example, the processor 102 determines the activities to display in the lesson flow panel, retrieves the corresponding icon for the activity type of each activity, and creates the activity icons. This determination may include accessing the user data store, determining whether the presenter has selected to exclude any of the subtopics (e.g., activities) in a topic package from display in the topic flow panel, and not creating a subtopic icon (e.g., activity icon) for any such excluded subtopic.

The content for the panels, menus, and buttons may include a definition of the control input generated when the user selects each of the selectable items or presses a button. The control input may be an instruction for the processor 102 to display other content, such as when a subtopic icon or linked trail element is selected. Such a control input may identify the other content to be displayed, such as by filename or other identifier. The control input may be an instruction to display, hide, or move one or more elements of the control interface, such as when a lesson flow access button is pressed or one of the selectable items in the control panel is selected. Such a control input may cause the processor 102 to execute a program, function, script, or other set of program instructions to determine the inputting user's location and update the control interface accordingly, as described below. At step 508, the processor 102 may load the obtained content into the visible control interface elements at their respective positions. This may be achieved with object-oriented programming of an executable program, with object-like HTML elements (e.g., a <div> element) in an HTML document, or with similar approaches according to the presentation framework.

Figure 6:
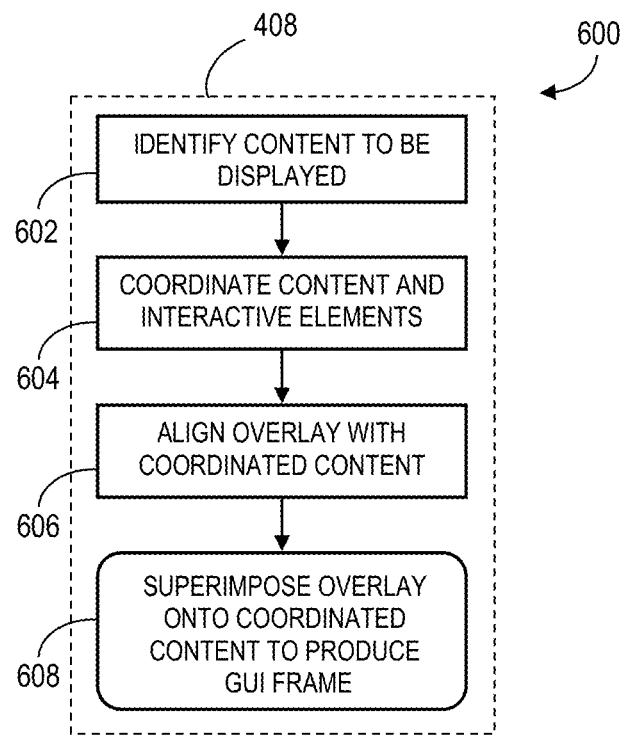
FIG. 6 is a flowchart of an example method of generating a display frame of a graphical user interface.

Returning to FIG. 4, at step 408 the processor 102 may generate the GUI frame to be displayed. Similar programming and design approaches to those of step 406 may be used to lay out the content in the GUI frame and then superimpose the control interface overlay (e.g., using stack ordering) on top of the content. FIG. 6 illustrates an exemplary method 600 of generating the GUI frame (step 408 of FIG. 4). At step 602, the processor 102 may identify, from the GUI data, the content to be displayed. This content includes the content data from the topic package, including static, dynamic, and interactive elements, as well as any additional display content from other sources (e.g., user data store 212). At step 604, the processor 102 may coordinate the content to be displayed with the interactive elements. In some embodiments, the processor 102 may identify regions in the GUI frame that will accept input data; these regions correspond to the interactive elements and to any selectable items that will be visible in the control interface. The processor 102 may further identify the type(s) of input data that each of the regions validly accept. For example, the processor 102 may identify interactive elements as text fields, or as buttons (i.e, can be clicked), or as moveable (i.e., can be clicked-and-dragged), and the like. The processor 102 may then associate the input data regions of the GUI frame with corresponding areas on the input device, such as when the input device is touch- and/or proximity-enabled.

At step 606, the processor 102 may align the control interface overlay with the coordinated content. In some embodiments, the bottom edge of the control interface overlay may be aligned with the bottom edge of the GUI frame. Then, at step 608 the processor 102 may superimpose the overlay onto the coordinated content to produce the GUI frame. In some embodiments, this includes integrating the data representing the control interface overlay into the data representing the GUI frame, such as by adding HTML elements or script modules to the GUI frame document.

Returning again to FIG. 4, at step 410, the processor 102 may render the GUI frame to the display device (e.g., display device 106 described above). Again, the processes of the rendering step depend on the format/framework in which the content is being presented. In a compiled, executable program, the processor 102 may call one or more graphics rendering libraries, or may pass the GUI frame to a graphics processor, to generate image data (i.e., pixel values for a display screen) representing the GUI frame, which the processor then sends to the display device. In a web interface or web application, the processor 102 may transmit the GUI frame in HTML or another markup language, or in ADOBE FLASH or another web application format, to a browser application (e.g., on a local device or an interactive whiteboard device) that then renders the GUI frame to the display device. Any suitable rendering protocol may be used.

In some embodiments, the transition of one or more control interface elements may be animated. The processor 102 may divide the transition into multiple segments that will each be associated with a GUI frame. For example, the path of the control panel 322 of FIG. 3B from its previous location 360 to its new location may be represented in ten segments that are iterated to show motion. The processor 102 does this by repeating steps 406-410 for each segment of the path, calculating a new position of the transitioning element(s) at each iteration. The animation terminates when the GUI frame having the element(s) in its/their final position(s) is rendered to the display (step 410).

At step 412, the processor 102 may receive input data indicating a user's interaction with the presentation (i.e., the user actuated the input device, such as by touching a touchscreen or clicking a mouse). At step 414, the processor 102 may unpack the input data to determine whether it is a valid input, i.e., that the input data was generated from a user input located within a region configured to receive input data, and that the input data is of a type accepted by the relevant input region. If the input data is not valid, it may be ignored. If the input data is valid, at step 416 the processor 102 may determine whether the input data is a control input generated by the user's interaction with one of the elements of the control interface. The input data, or the corresponding input region, may have an identifier that provides the requisite indication to the processor 102. If the input data is not a control input, then it is an input related to one of the interactive elements in the displayed subtopic; at step 430, the processor 102 may process such input data according to the topic package content data.

If the input data is a control input, at step 420 the processor 102 may determine the location of the inputting user with respect to the presentation area (i.e., display surface or display panel of the display device). In some embodiments, the control input may identify which element of the control interface generated the control input. For example, the control input may identify that it came from the left lesson flow access button. Since the processor 102 has access to the position of each control interface element, the processor 102 may determine whether the user is closer to the left edge or the right edge of the presentation area based on the element that was selected. In other embodiments, such as when the input device is a touchscreen, the control input may include coordinates of the user's tap or other gesture. The processor 102 may determine whether the user is closer to the left edge or the right edge of the presentation area based on the input coordinates; or, the processor 102 may convert the input coordinates to a location on the GUI frame and may determine whether the user is closer to the left edge or the right edge of the presentation area based on the location in the GUI frame.

At step 422, the processor 102 may update the control interface according to the received control input and the determined location of the user. That is, the processor 102 reads and reacts to the user's command to execute a control task. The processor 102 may determine the control task to be executed from the control input. Using program instructions, lookup tables, database queries, and the like, the processor 102 may determine which control interface elements may be affected by the control task, and how. In particular, the processor 102 may determine, for one or more of the elements, one or more parameter values that might be changed; then, the processor 102 may determine whether the new value is different from the current value of each such parameter. If so, the processor 102 may write the new value to the control interface resources 214. In some embodiments, the new value is written while retaining the old value; the processor 102 may use both the new and the previous values to perform tasks such as animating transition(s) of the control interface elements. In other embodiments, the new value may replace the old value. In other embodiments, the processor 102 may write the new parameter values to the control interface resources 214 without comparing the new values to the current values.

Once the control interface parameters are updated, the processor 102 may generate the GUI frame(s) that display the changes resulting from execution of the control task. The method 400 returns to step 406 and proceeds as described above.

Figure 7:
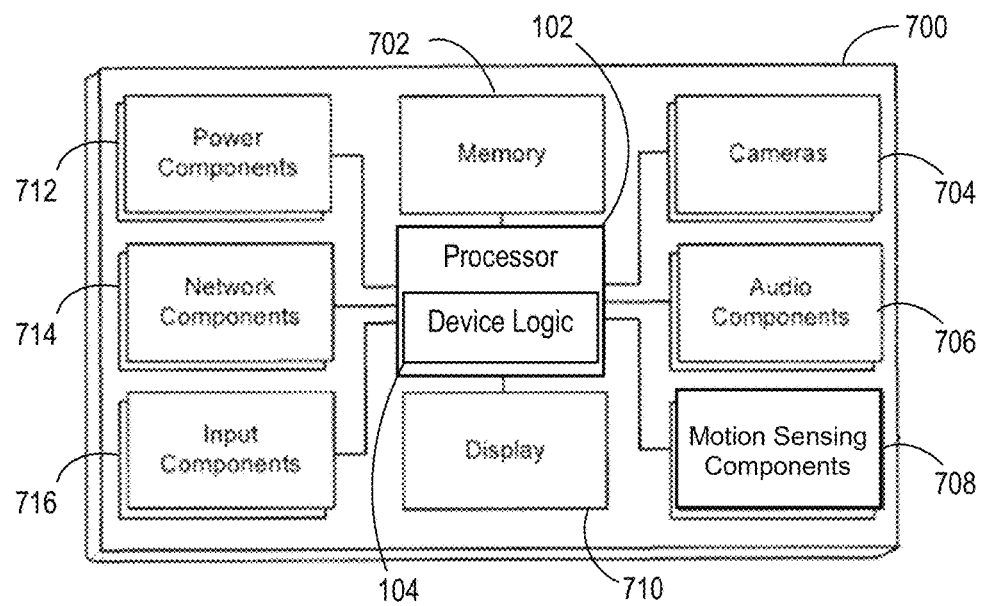
FIG. 7 is a schematic diagram of electrical components for a computing device in accordance with the present disclosure.

FIG. 7 illustrates a logical arrangement of a set of general components of an example computing device 700 that contains the processor 102 and the device logic 104 and operates as any of the above-described exemplary computing devices 100, 200, 240, 280. The computing device 700 may include a memory component 702, which can include many types of memory, data storage, or non-transitory computer-readable storage media, such as data stores for program instructions, images and other data, a removable memory for sharing information with other devices, etc. One or more cameras 704 or other image sensors may capture image or video content. A camera can include, or be based at least in part upon any appropriate technology, such as a CCD or CMOS image sensor having a sufficient resolution, focal range, and/or viewable area, to capture an image of the user when the user is operating the device. An image sensor can include a camera or infrared sensor that is able to image projected images or other objects in the vicinity of the device. It should be understood that image capture can be performed, for example, using a single image, multiple images, periodic imaging, continuous image capturing, image streaming, and/or other suitable processes. Further, a device can include the ability to start and/or stop image capture, such as when receiving a command from a user, application, or other device. The computing device 700 can similarly include at least one audio component 706, such as a mono or stereo microphone or microphone array, operable to capture audio information from at least one primary direction. A microphone can be a uni-directional or omni-directional microphone as known for such devices.

The computing device 700 also can include one or more orientation and/or motion sensors 708. Such sensor(s) can include any suitable proximity sensing or range sensing device, and may sense general motion or be configured to detect a cooperating device, such as a specially configured stylus. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations of the device or of a target, through triangulation or another such approach. These mechanisms can communicate with the processor 102, whereby the device can perform any of a number of actions such as detecting tilt as user input.

A display 710 of the computing device 700 may be a monitor, liquid crystal display (LCD) screen, light-emitting diode (LED or organic LED (OLED) screen, or other output-only video display. The display 710 may also function as an input device, such as a capacitive, resisitive, or inductive touchscreen. In some embodiments, the processor 102 may use graphical presentation technology of the computing device 700 to facilitate the presentation on the display 710 of items in the presently described interfaces.

The computing device 700 includes various power components 712 known in the art for providing power to a computing device, which can include capacitive charging elements for use with a power pad or similar device. The computing device can include one or more communication elements or networking sub-systems 714, such as a Wi-Fi, Bluetooth, radio frequency (RF), wired, or wireless communication system. The device in many embodiments can communicate with a network, such as the Internet, and may be able to communicate with other such devices. In some embodiments the device can include at least one additional input component 716 able to receive touch- or proximity-sensitive input as described above, or conventional input, from a user. This conventional input can include, for example, a push button, touch pad, touchscreen, wheel, joystick, keyboard, mouse, keypad, or any other suitable component or element whereby a user can input a command to the device. In some embodiments, however, such a device might not include any buttons at all, and might be controlled only through a combination of visual and audio commands, such that a user can control the device without having to be in contact with the device.

The components may reside on a single computing device 700, such as an interactive whiteboard, a personal computing device (e.g., laptop or tablet computer, smartphone) or one or more cooperating servers 804 (see FIG. 8), or some of the components may reside on a personal computing device 700 and others on the cooperating server(s) 804. For example, the processor 102, memory 702, and network components 714 may reside on the cooperating server(s) 804, while the other components reside on the personal computing device 700. Or, the computing devices 700 may each have a discrete instance of one or more of the components.

Figure 8:
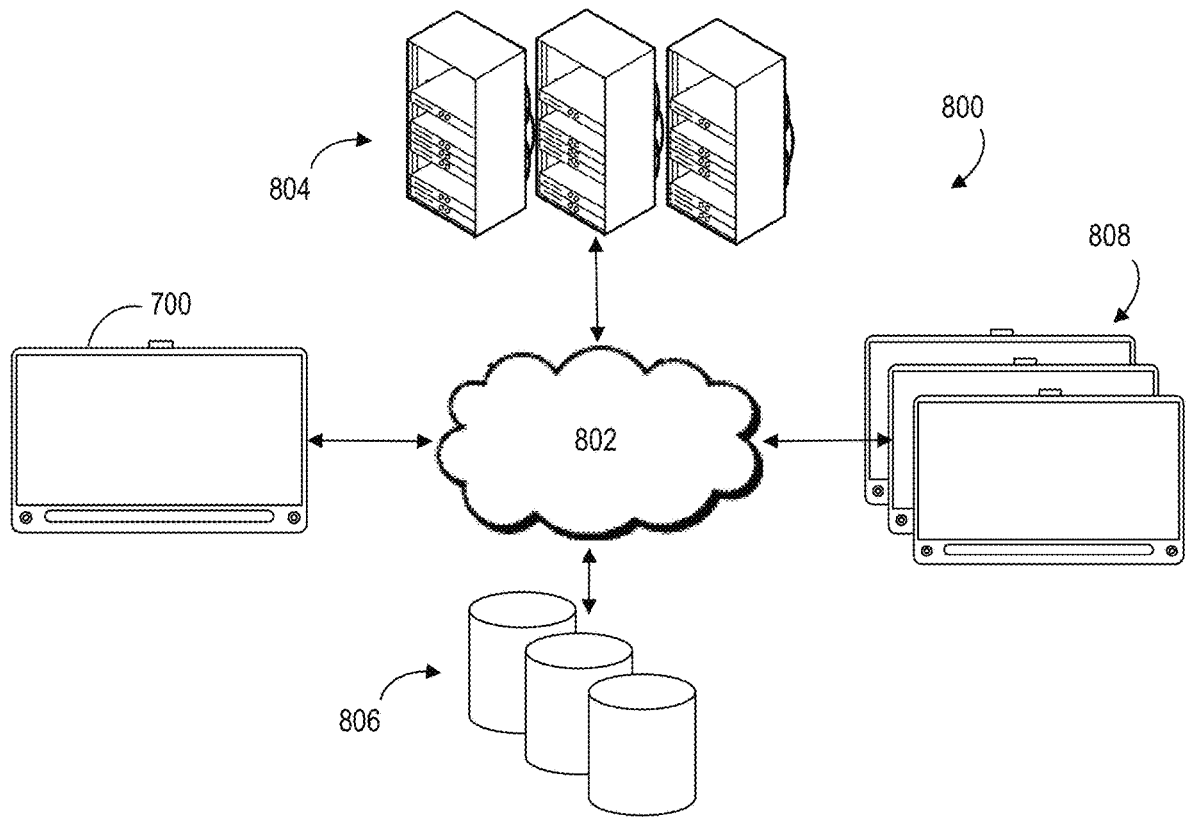
FIG. 8 is a diagram of a communication network for use in a system of the present disclosure.

FIG. 8 illustrates aspects of an example environment 800 for implementing aspects in accordance with various embodiments. As will be appreciated, while a local environment completely physically contained on the computing device 700 may be used, different distributed environments may also be used, as appropriate, to implement various embodiments. The example environment 800 includes the computing device 700, which is operable to send and/or receive requests, messages or information over an appropriate network 802 and, in some embodiments, convey information back to a user of the computing device 700. The network 802 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network 802 are well known and will not be discussed in detail. Communication over the network 802 can be enabled by wired or wireless connections and combinations thereof. The example environment 800 may further include other user devices 808 communicatively coupled to the network 802. The communication network 802 may facilitate completion of tasks by providing a connection to data stores 806, such as topic package, user data, or other data stores, that are remote from the computing device 700. Additionally, the communication network 802 may facilitate transmission of messages and data, including topic packages and user-generated data, between the computing device 700 and one or more of the cooperating servers 804.

The environment 800 includes one or more cooperating servers 804. It should be understood that there could be several cooperating servers 804 of homogenous or varying types, layers or other elements, processes or components, which may be chained or otherwise configured, which can interact to perform tasks such as obtaining data from an appropriate data store 806 that is accessible locally to the cooperating server 804 or remotely over the network 802. Servers, as used, may be implemented in various ways, such as hardware devices or virtual computer systems. In some contexts, servers may refer to a programming module being executed on a computer system. The cooperating servers 804 can include any appropriate hardware, software and firmware for integrating with the data store as needed to execute aspects of one or more applications for the client device, handling some or all of the data access and business logic for an application. The cooperating servers 804 may provide access control services in cooperation with the data stores 806 and are able to generate content including, text, graphics, audio, video and/or other content usable to be provided to the user, which may be served to the computing device 700 in any suitable format, including HyperText Markup Language ("HTML"), Extensible Markup Language ("XML"), JavaScript, Cascading Style Sheets ("CSS"), or another appropriate client-side structured language. Content transferred to the computing device 700 may be processed by the computing device 700 to provide the content in one or more forms including forms that are perceptible to the user audibly, visually and/or through other senses including touch, taste, and/or smell. The handling of all requests and responses, as well as the delivery of content between the computing device 700 and the cooperating servers 804, can be handled by one of the cooperating servers 804, such as a web server using PHP: Hypertext Preprocessor ("PHP"), Python, Ruby, Perl, Java, HTML, XML, or another appropriate server-side structured language in this example. It should be understood that the cooperating servers 804 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data stores 806 can include several separate data tables, databases, data documents, dynamic data storage schemes and/or other data storage mechanisms and media for storing data relating to a particular aspect of the present disclosure, including without limitation the topic package data store 210, the user data store 212, and the control interface resources 214 described above. It should be understood that there can be many aspects that may need to be stored in the data store, such as user information and access rights information, which can be stored in any appropriate mechanisms in the data stores 806. The data stores 806 may be operable, through logic associated therewith, to receive instructions from the cooperating servers 804 and obtain, update, or otherwise process data in response thereto. The cooperating servers 804 may provide static, dynamic or a combination of static and dynamic data in response to the received instructions. Dynamic data, such as data used in web logs (blogs), web or mobile applications and application interfaces, news services and other applications may be generated by server-side structured languages as described or may be provided by a content management system ("CMS") operating on, or under the control of, the cooperating servers 804. In one example, the computing device 700 may generate GUI frames that include the control interface, sent to the computing device 700 by the cooperating server(s) 804, to a user. In this case, the data store might access the stored data to provide validation of user edits. An updated GUI frame including validated edits then can be returned to the user via display on the computing device 700.

Each server 804 typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

What is claimed is:

1. A system, comprising at least one processor executing instructions within a memory coupled to a computing device, the instructions causing the computing device to:
    receive, from an electronic data store coupled to the computing device, a graphical user interface (GUI) data including:
        a presentation content;
        a plurality of buttons comprising a first set of graphical buttons or icons representing a flow of topics or subtopics, the first set of graphical buttons or icons configured to:
            graphically indicate a current position within the flow of topics or subtopics;
            receive a first user input to navigate the flow of topics in a sequential order; and
            receive a second user input to navigate the flow of topics or subtopics in a non-sequential order; and
        at least one display parameter within at least one program instruction which, when implemented by the at least one processor, renders and displays at least one control panel at a first position within a lower half of the GUI, and updates the GUI to display the at least one control panel at a second position within the lower half of the GUI;
    generate, from the GUI data:
        the presentation content within a first graphic content layer of the GUI; and
        the at least one control panel, assigned to a content interface overlay within a second graphic content layer with a higher z-index value than the first graphic content layer, at the first position within the lower half of the GUI according to the at least one display parameter, the at least one control panel comprising:
            the plurality of buttons;
            a second set of graphical buttons or icons configured to receive a third user input to interact with the presentation content; and
            a content editing panel configured to highlight, alter displayed content, or generate notes in association with the presentation content;
    identify within the GUI:
        at least one additional visible GUI interface element; and
        a plurality of pixel coordinates for the at least one additional visible GUI interface element;
    position the at least one control panel so that it does not overlay the plurality of pixel coordinates associated with the at least one additional visible GUI interface element;
    render the GUI on a display device;
    receive, from the at least one control panel via a user input device, a control input;
    determine, from the control input, a location of a user of the computing device; and
    update the first position of the control panel within the lower half of the GUI to the second position within the lower half of the GUI based on the location of the user and the at least one display parameter, wherein the update to the second position includes an animation comprising:
        dividing a distance between the first position and the second position into a plurality of GUI frames iterated to show motion;
        calculating a new position of a transitioning element at each of a plurality of iterations;
        iteratively rendering a GUI frame sequentially for each of the plurality of GUI frames at each of the plurality of iterations, and
        terminating the animation at the second position.

2. The system of claim 1, wherein the computing device comprises:
    an interactive whiteboard device including the processor, the memory, the electronic data store, the input device, and the display device;
    the interactive whiteboard device including the input device and the display device, and coupled to the processor, the memory, and the electronic data store; or
    the interactive whiteboard device including the input device and the display device, and coupled to a local computing device and, through a network, to a server including the processor and coupled to the electronic data store.

3. The system of claim 1, wherein the GUI is generated by:
   receiving, from the electronic data store:
      the at least one display parameter; and
         a plurality of control interface data for configuring and rendering the at least one control panel;
   determining, from the plurality of control interface data, a visibility of:
      the at least one control panel; and
      at least one graphical button or icon to be displayed on the at least one control panel;
   identifying the first position within the plurality of control interface data; and
   aligning the at least one control panel to be overlaid on the GUI at the first position.

4. The system of claim 1, wherein:
   the control input comprises:
      a first tab located on a left of the plurality of buttons; or
      a second tab located on a right of the plurality of buttons; and
   wherein:
      responsive to the user selecting the first tab:
         the computing device determines that the location of the user is to the left of the computing device; and
         the first position of the control panel is updated to the left of the GUI; and
      responsive to the user selecting the second tab:
         the computing device determines that the location of the user is to the right of the computing device; and
         the first position of the control panel is updated to the right of the GUI.

5. The system of claim 1, wherein the plurality of buttons and the content editing panel are not overlaid, wherein a change in a position of the plurality of buttons causes the content editing panel to be repositioned, within the GUI, relative to the plurality of buttons.

6. The system of claim 1, wherein the second set of graphical buttons or icons comprise:
   a first graphical button or icon configured to receive a fourth user input for moving the at least one control panel;
   a second graphical button or icon configured to receive a fifth user input for transmitting assignments associated, in the electronic data store, with the display data;
   a third graphical button or icon configured to receive a sixth user input for generating and storing notes associated, in the electronic data store, with the display data; or
   a fourth graphical button or icon configured to receive a seventh user input for adding graphical content associated, in the electronic data store, with the display data.

7. The system of claim 1, wherein the plurality of buttons include a navigation breadcrumb.

8. The system of claim 1, wherein the plurality of buttons comprises a third set of graphical buttons or icons comprising:
   a plurality of lessons associated, in the electronic data store, with the presentation content; or
   a plurality of resources associated, in the electronic data store, with the presentation content.

9. A method, comprising:
   receiving, by a computing device comprising at least one processor executing instructions within a memory, from an electronic data store coupled to the computing device, a graphical user interface (GUI) data including:
      a presentation content;
      a plurality of buttons comprising a first set of graphical buttons or icons representing a flow of topics or subtopics, the first set of graphical buttons or icons configured to:
         graphically indicate a current position within the flow of topics or subtopics;
         receive a first user input to navigate the flow of topics in a sequential order; and
         receive a second user input to navigate the flow of topics or subtopics in a non-sequential order; and
      at least one display parameter within at least one program instruction which, when implemented by the at least one processor, renders and displays at least one control panel at a first position within a lower half of the GUI, and updates the GUI to display the at least one control panel at a second position within the lower half of the GUI;
   generating, by the computing device, from the GUI data:
      the presentation content within a first graphic content layer of the GUI; and
      at least one control panel, assigned to a content interface overlay within a second graphic content layer with a higher z-index value than the first graphic content layer, at the first position within the lower half of the GUI according to the at least one display parameter, the at least one control panel comprising:
         the plurality of buttons;
         a second set of graphical buttons or icons configured to receive a third user input to interact with the presentation content; and
         a content editing panel configured to highlight, alter displayed content, or generate notes in association with the presentation content;
   identifying, by the computing device, within the GUI:
      at least one additional visible GUI interface element; and
      a plurality of pixel coordinates for the at least one additional visible GUI interface element;
   positioning, by the computing device, the at least one control panel so that it does not overlay the plurality of pixel coordinates associated with the at least one additional visible GUI interface element;
   rendering, by the computing device, the GUI on a display device;
   receiving, by the computing device, from the at least one control panel via a user input device, a control input;
   determining, by the computing device, from the control input, a location of a user of the computing device; and
   updating, by the computing device, the first position of the control panel within the lower half of the GUI to the second position within the lower half of the GUI based on the location of the user and the at least one display parameter, wherein the updating the first position to the second position includes an animation comprising:
      dividing a distance between the first position and the second position into a plurality of GUI frames iterated to show motion;
      calculating a new position of a transitioning element at each of a plurality of iterations;
      iteratively rendering a GUI frame sequentially for each of the plurality of GUI frames at each of the plurality of iterations, and
      terminating the animation at the second position.

10. The method of claim 9, wherein the computing device comprises:
- an interactive whiteboard device including the processor, the memory, the electronic data store, the input device, and the display device;
- the interactive whiteboard device including the input device and the display device, and coupled to the processor, the memory, and the electronic data store; or
- the interactive whiteboard device including the input device and the display device, and coupled to a local computing device and, through a network, to a server including the processor and coupled to the electronic data store.

11. The method of claim 9, wherein generating the GUI further comprises the steps of:
- receiving, by the computing device, from the electronic data store:
  - the at least one display parameter; and
  - a plurality of control interface data for configuring and rendering the at least one control panel;
- determining, by the computing device, from the plurality of control interface data, a visibility of:
  - the at least one control panel; and
  - at least one graphical button or icon to be displayed on the at least one control panel;
- identifying, by the computing device, the first position within the plurality of control interface data; and
- aligning, by the computing device, the at least one control panel to be overlaid on the GUI at the first position.

12. The method of claim 9, wherein:
the control input comprises:
- a first tab located on a left of the plurality of buttons; or
- a second tab located on a right of the plurality of buttons; and wherein:
- responsive to the user selecting the first tab:
  - the computing device determines that the location of the user is to the left of the computing device; and
  - the first position of the control panel is updated to the left of the GUI; and
- responsive to the user selecting the second tab:
  - the computing device determines that the location of the user is to the right of the computing device; and
  - the first position of the control panel is updated to the right of the GUI.

13. The method of claim 9, wherein the plurality of buttons and the content editing panel are not overlaid, wherein a change in a position of the plurality of buttons causes the content editing panel to be repositioned, within the GUI, relative to the plurality of buttons.

14. The method of claim 9, wherein the second set of graphical buttons or icons comprise:
- a first graphical button or icon configured to receive a fourth user input for moving the at least one control panel;
- a second graphical button or icon configured to receive a fifth user input for transmitting assignments associated, in the electronic data store, with the display data;
- a third graphical button or icon configured to receive a sixth user input for generating and storing notes associated, in the electronic data store, with the display data; or
- a fourth graphical button or icon configured to receive a seventh user input for adding graphical content associated, in the electronic data store, with the display data.

15. The method of claim 9, wherein the plurality of buttons include a navigation breadcrumb.

16. The method of claim 9, wherein the plurality of buttons comprises a third set of graphical buttons or icons comprising:
- a plurality of lessons associated, in the electronic data store, with the presentation content; or
- a plurality of resources associated, in the electronic data store, with the presentation content.

* * * * *